United States Patent [19]

Maeda

[11] Patent Number: 5,130,501
[45] Date of Patent: Jul. 14, 1992

[54] VEHICLE SEAT SWITCH WITH INTERLOCKED ACTUATORS

[75] Inventor: Takuya Maeda, Furukawa, Japan

[73] Assignee: Alps Electric Co., Ltd., Tokyo, Japan

[21] Appl. No.: 698,363

[22] Filed: May 8, 1991

Related U.S. Application Data

[63] Continuation of Ser. No. 428,802, Oct. 30, 1989, abandoned.

[30] Foreign Application Priority Data

Feb. 14, 1989 [JP] Japan .................. 1-15283[U]

[51] Int. Cl.⁵ ............................................ H01H 9/26
[52] U.S. Cl. ............................... 200/50 C; 200/5 B
[58] Field of Search ............ 200/5 R, 5 B, 5 C, 5 D, 200/5 E, 50 C

[56] References Cited

U.S. PATENT DOCUMENTS

| | | | |
|---|---|---|---|
| 2,080,964 | 5/1937 | Forstrom | 200/50 C |
| 2,647,964 | 8/1953 | Merkel | 200/50 C |
| 3,196,227 | 7/1965 | Carter et al. | 200/50 C |
| 3,369,100 | 2/1968 | Kussy et al. | 200/50 C X |
| 3,674,948 | 7/1972 | Bettejewski et al. | 200/5 B X |
| 3,784,765 | 1/1974 | Daly | 200/5 R |
| 4,095,059 | 6/1978 | Nishioka et al. | 200/5 B |
| 4,115,670 | 9/1978 | Chandler | 200/50 C X |
| 4,563,552 | 1/1986 | Fushimoto | 200/50 A X |
| 4,629,837 | 12/1986 | Carr | 200/50 C |
| 4,659,880 | 4/1987 | Kondo et al. | 200/5 R |
| 4,843,192 | 6/1989 | Kamada et al. | 200/50 C |
| 4,924,041 | 5/1990 | Yee | 200/50 C |

FOREIGN PATENT DOCUMENTS 1-17057  5/1989  Japan .

Primary Examiner—J. R. Scott
Attorney, Agent, or Firm—Guy W. Shoup; David H. Carroll

[57] ABSTRACT

A switch device comprising a first sliding switch operated by a first knob, a second sliding switch operated by a second knob, a connecting member for connecting the slider of the first sliding switch and the slider of the second sliding switch and a mechanism prohibiting operation of the second sliding switch when the first sliding switch is operated and conversely prohibiting operation of the first sliding switch when the second sliding switch is operated. With such an arrangement, the capacity of the electro-conductive network for power source which is shared by the two sliding switches in such a switch device can be significantly reduced and consequently the size and weight as well as the manufacturing cost of such a device can be considerably reduced. Such a switch device can be conveniently used for a power operated automobile seat.

9 Claims, 9 Drawing Sheets

VEHICLE SEAT SWITCH WITH INTERLOCKED ACTUATORS

This application is a continuation of application Ser. No. 07/428,802, filed Oct. 30, 1989 now abandoned.

BACKGROUND OF THE INVENTION

1. Field of the Invention

This invention relates to a switch device and more particularly to a switch device comprising a pair of sliding switches arranged in the proximity of each other and operated by respective separate knobs, said pair of sliding switches utilizing a common electro-conductive network for power supply.

2. Prior Art

FIGS. 13 and 14 of the accompanying drawings illustrate a conventional switch device typically used for a powered seat system of an automobile.

FIG. 13 schematically shows the configuration of such a switch device comprising four sliding switches SW1, SW2, SW3, and SW4 arranged within a case 81. Of the four sliding switches, three switches SW1, SW2 and SW3 are operated by a first knob 82 and the last one SW4 is operated by a second knob 83.

More specifically, the sliding switch SW1 is turned on by pivotally moving the left end portion of the first knob 82 in the direction indicated by either arrow A or arrow B in order to, for example, raise or lower the front section of the automobile seat to which it is associated.

The sliding switch SW2 is turned on by sliding the first knob 82 in the direction indicated by either arrow C or arrow D in order to, for example, advance or retreat the automobile seat.

The sliding switch SW3 is turned on by pivotally moving the right end portion of knob 82 in the direction indicated by either arrow E or arrow F in order to, for example, raise or lower the rear section of the automobile seat.

The sliding switch SW4 is turned on by pivotally moving the second knob 83 around the fulcrum 83a in the direction indicated by either arrow G or arrow H in order to, for example, tilt the back of the automobile seat.

FIG. 14 schematically illustrates the electric wiring of the switch device as described above. The sliding switches SW1 and SW2 are connected to a power source, not shown in the drawing, and a driving mechanism of the automobile seat, for example an electric motor, which is not shown as well, by way of a conductor network 84. On the other hand, the sliding switches SW3 and SW4 are connected to another power source, not shown, and another driving mechanism of the automobile seat, for example an electric motor, which is not shown as well, by way of another conductor network 85.

PROBLEMS TO BE SOLVED BY INVENTION

Since the sliding switches SW1, SW2, and SW3 are independently operated by selecting the direction of operating the knob 82, any two or more than two of these switches will never be operated simultaneously. Therefore, the electric conductor network 84 for connecting the sliding switches SW1 and SW2 is required to have a capacity to accommodate an electric current large enough to feed only one of the driving mechanisms of the automobile seat.

On the other hand, however, as the sliding switches SW3 and SW4 are operated by using separate knobs 82 and 83, these switches can be operated simultaneously. Therefore, the electric conductor network 85 for connecting the sliding switches SW3 and SW4 should have a capacity large enough to accommodate an electric current to feed the two driving mechanisms of the automobile seat at the same time, making the overall switch device containing such a conductor network large and heavy as well as costly.

It is therefore an object of the present invention to provide a small and lightweight switch device that can be manufactured at a reduced cost to get rid of the above and other problems of prior art.

MEANS TO SOLVE THE PROBLEMS

The above and other objects of the present invention are achieved by providing a switch device comprising a first sliding switch operated by a first knob, a second sliding switch operated by a second knob, a connecting member for connecting the slider of said first sliding switch and the slider of said second sliding switch and an engaging means arranged between said connecting member and a case slidably containing said sliding members to prohibit operation of said second sliding switch when said first sliding switch is operated and conversely to prohibit operation of said first sliding switch when said second sliding switch is operated.

EFFECTS

BY connecting the two sliding members of the two sliding switches with a connecting member, said connecting member can be separately operated by operating one of the two sliding members. Therefore, by arranging pair of engaging means on a connecting member in a switch device in such a manner that one of said engaging means constitutes a set of engaging means with the case so that, when the first slider is operated, said engaging means is engaged with the moving portion of the slider and the other engaging means prohibits the operation of the second slider and the other engaging means also constitutes a set of engaging means with the case so that, when the second slider is operated, said engaging means is engaged with the moving portion of the slider and the other engaging means prohibit the operation of the first slider, the switch device can always automatically prohibit the operation of either one of the sliders.

With such an arrangement, the capacity of the electro-conductive network for power source which is shared by the two sliding switches in such a switch device can be significantly reduced and consequently the size and weight as well as the manufacturing cost of such a device can be considerably reduced.

Now the present invention will be described in greater detail by referring to the accompanying drawings which illustrate a preferred embodiment of the present invention.

DETAILED DESCRIPTION OF THE INVENTION

Figure 1:
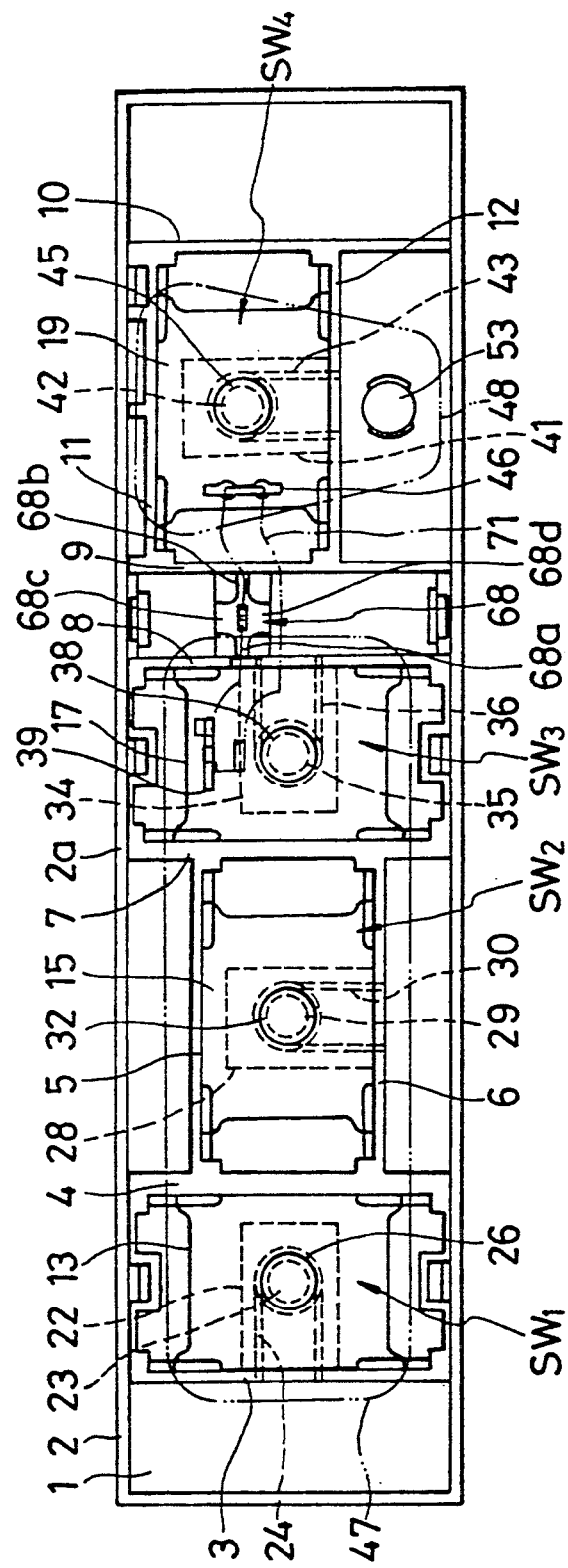
FIG. 1 is a plan view of a preferred embodiment of the switch device according to the present invention showing the inside by removing the ceiling plate of the case.
Figure 2:
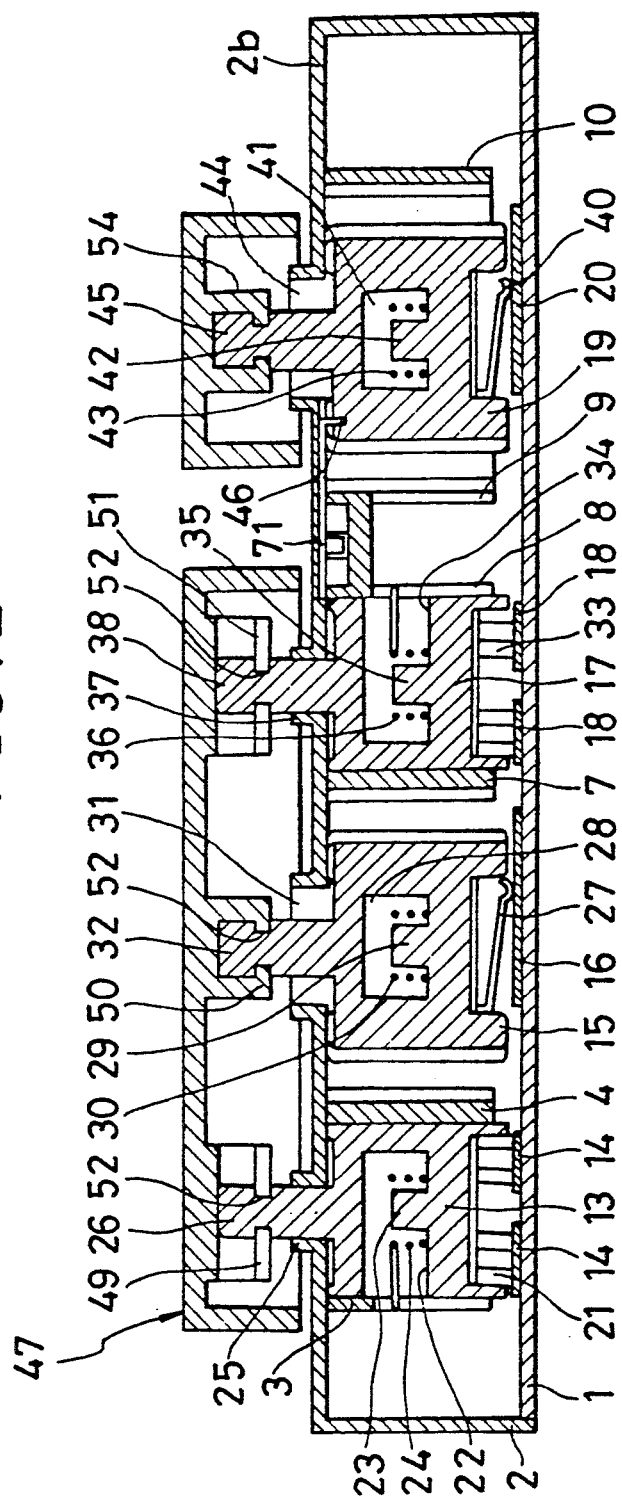
FIG. 2 is a vertical sectional view of the embodiment of FIG. 1.

Referring to FIGS. 1 and 2 showing an embodiment of the switch device according to the present invention, the switch device comprises a substrate 1 and a case 2 and contains an inner space formed by the substrate and the case, the space being divided into a plurality of subspaces by partitions 3 through 12 provided in the case 2, four of the sub-spaces respectively containing four sliding switches SW1, SW2, SW3 and SW4.

More specifically, the sliding switch SW1 is slidably arranged between the partitions 3 and 4, the sliding switch SW1 comprising a slider 13 to be operated in the direction perpendicular to a longitudinal side wall 2a of the case 2, an electro-conductive patterned network 14 formed in the area surrounded by the portions 3 and 4 and the side wall 2a of the case 2 on the upper surface of the substrate 1.

Likewise, the sliding switch SW2 is slidably arranged between the partitions 5 and 6, the sliding switch SW2 comprising a slider 15 to be operated in the direction parallel to the longitudinal axis of the case 2, an electro-conductive patterned network 16 formed in the area surrounded by the portions 4, 5, 6 and 7 on the upper surface of the substrate 1.

The sliding switch SW3 is slidably arranged between the partitions 7 and 8, the sliding switch SW3 comprising a slider 17 to be operated in the direction perpendicular to the longitudinal side wall 2a of the case 2, an electro-conductive patterned network 18 formed in the area surrounded by the partitions 7 and 8 on the upper surface of the substrate 1.

Finally, the sliding switch SW4 is slidably arranged between the partitions 9 and 10, the sliding switch SW4 comprising a slider 19 to be operated in the direction parallel to the longitudinal axis of the case 2, an electro conductive patterned network 20 formed in the area surrounded by the portions 9, 10, 11 and 12 on the upper surface of the substrate 1.

Figure 14:
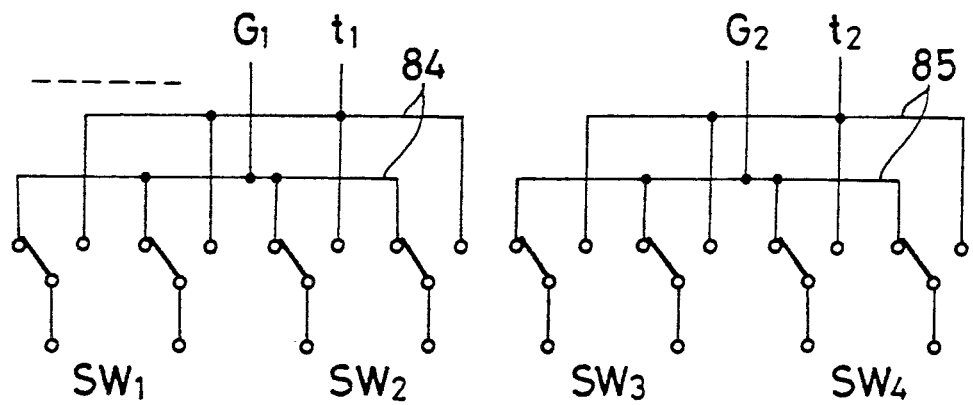
FIG. 14 is a circuit diagram of the switch device of FIG. 13.

The electro-conductive patterned network 14 of the sliding switch SW1 and the electro-conductive patterned network 16 of the sliding switch SW2 are connected with a power source and an electric load such as a drive motor of an automobile seat by way of a power source conductor network. On the other hand, the electro-conductive patterned network 18 of the sliding switch SW3 and the electro-conductive patterned network 20 of the sliding switch SW4 are connected with the power source and the electric load by way of another power source conductor network. The configuration of these conductor networks is similar to the power source conductor networks 84 and 85 illustrated in FIG. 14 and therefore they will not be illustrated here nor will be described any further.

A sliding member 21 obliquely running downward is attached to the lower surface of the slider 13 and electrically connected to the electro-conductive patterned network 14. A recess 22 is formed on the surface of the side of the slider 13 facing the partition 3 and an engaging shaft 23 is formed within the recess 22, a coil spring 24 being arranged around the shaft 23. With such an arrangement, the slider 13 is elastically held approximately at the center of the sub-space formed by the partitions 3 and 4 and the side wall 2a of the case 2. Further, a drive shaft 26 is provided on the upper surface of the slider 13, protruding upward from the case 2 through an oblong bore 25 formed in the ceiling plate 2b.

Similarly, a sliding member 27 obliquely running, downward is attached to the lower surface of the slider 15 and electrically connected to the electro-conductive patterned network 16. A recess 28 is formed on the surface of the side of the slider 15 facing the partition 6 and an engaging shaft 29 is formed within the recess 28, a coil spring 30 being arranged around the shaft 29. Each of the both ends of the coil spring 30 has an extension running to the outside of the slider 15 and rigidly fitted to the partition 6. With such arrangement, the slider 15 is elastically held approximately at the center of the sub-space formed by the partitions 4, 5, 6 and 7. Further, a drive shaft 32 is provided on the upper surface of the slider 15, protruding upward from the case 2 through an oblong bore 31 formed in the ceiling plate 2b.

Likewise, a sliding member 33 obliquely running downward is attached to the lower surface of the slider 17 and electrically connected to the electro-conductive patterned network 18. A recess 34 is formed on the surface of the side of the slider 17 facing the partition 8 and an engaging shaft 35 is formed within the recess 34, a coil spring 36 being arranged around the shaft 29. Each of the two ends of the coil spring 36 has an extension running to the outside of the slider 17 and rigidly fitted to said partition 8. With such an arrangement, the slider 15 is elastically held approximately at the center of the subspace formed by the partitions 7 and 8 and the side wall 2a of the case 2. Further, a drive shaft 38 is provided on the upper surface of the slider 17, protruding upward from the case 2 through an oblong bore 37 formed in the ceiling plate 2b. Another recess 39 is additionally formed on the upper surface of the slider 17, running parallel to the side wall 2a of the case 2.

Finally, a sliding member 40 obliquely running downward is attached to the lower surface of the slider 19 and electrically connected to the electro-conductive patterned network 20. A recess 41 is formed on the surface of the side of the slider 19 facing the partition 12 and an engaging shaft 42 is formed within the recess 41, a coil spring 43 being arranged around the shaft 42. Each of the two ends of the coil spring 43 has an extension running to the outside of the slider 19 and rigidly fitted to said partition 12. With such an arrangement, the slider 19 is elastically held approximately at the center of the subspace formed by the partitions 9 10, 11 and 12. Further, a drive shaft 45 is provided on the upper surface of the slider 19, protruding upward from the case 2 through an oblong bore 44 formed in the ceiling plate 2b. Another recess 46 is additionally formed on the upper surface of the slider 17, running perpendicular to the side wall 2a of the case 2.

Reference numeral 47, in FIGS. 1 and 2 denotes a first knob for operating the sliders 13, 15 and 17, while reference numeral 48 denotes a second knob for operating the slider 19.

As illustrated in FIG. 2, the first knob 47 comprises three guide sections 49, 50 and 51 formed respectively to receive the drive shafts 26, 32 and 38 protruding upward respectively from the upper surface of the sliders 13, 15 and 17. The first knob 47 and the sliders become united as the guide sections 49, 50 and 51 are respectively engaged with the grooves 52 formed near the top of the drive shafts 26, 32 and 38.

Of the the guide sections, the two outer guide sections 49 and 51 for receiving respectively the drive shafts 26 and 38 are so formed that they run parallel to the longitudinal direction of the first knob 47. Consequently, when the first knob 47 is operated in the direction parallel to the side wall 2a of the case 2, it does not affect the drive shafts 26 and 38, whereas it causes the drive shafts 26 and 38 to respectively drive the slider 13 and 17 when it is operated in the direction perpendicular to the side wall 2a of the case 2. On the other hand, the central guide 50 for receiving the drive shaft 32 is so formed that it runs perpendicular to the other two guides 49 and 51. Thus, when the first knob 47 is operated in the direction parallel to the side wall 2a of the case 2, it causes the drive shaft 32 to drive the slider 15, whereas it does not affects the drive shaft 32 when the left- or rightmost portion of the first knob 47 is operated in the direction perpendicular to the side wall 2a of the case 2.

As illustrated in FIG. 1, the second knob 48 is arranged on the case 2 such that it can pivotally revolve around the fulcrum 53. As seen from FIG. 2, an engaging section 54 is formed on the inside of the second knob 48 to engagedly receive the drive shaft 45 protruding from the upper surface of the slider 19 such that the slider 19 can be driven in the lateral direction along the partitions 11 and 12 as seen on FIG. 1 by pivotally moving the second knob 48 around the fulcrum 53.

Figure 3:
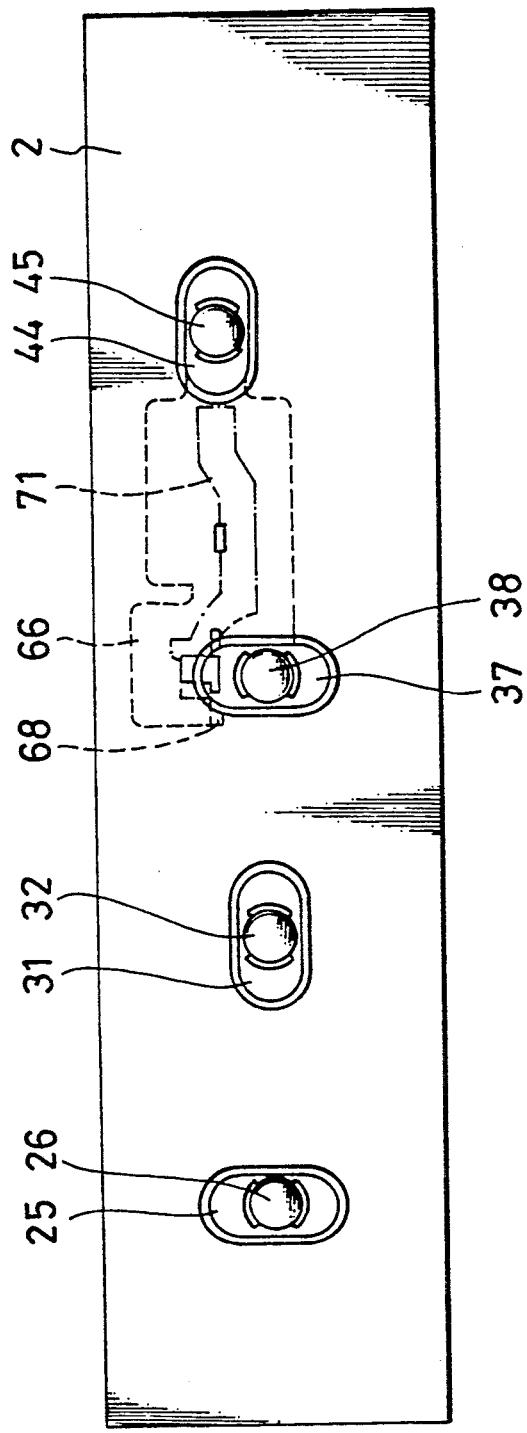
FIG. 3 is a plan view of the embodiment of FIG. 1, from which the knobs are taken away.
Figure 4:
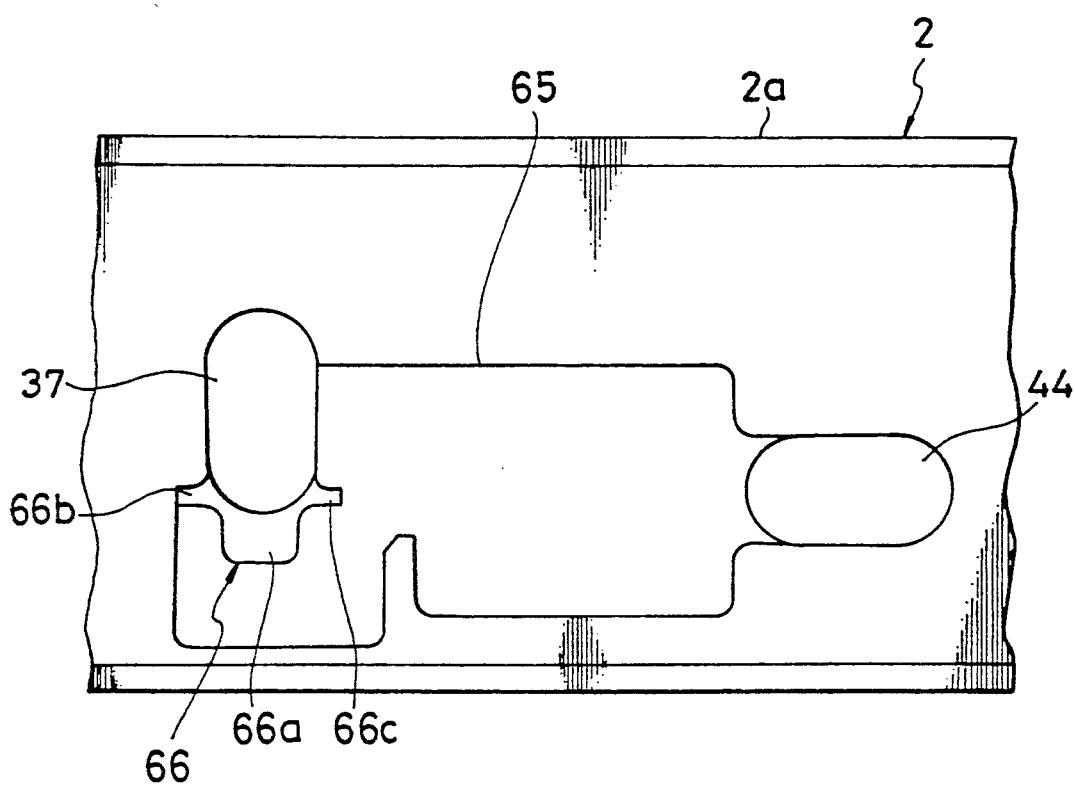
FIG. 4 is a plan view of the embodiment of FIG. 1, showing the inside of the principal portion.
Figure 5:
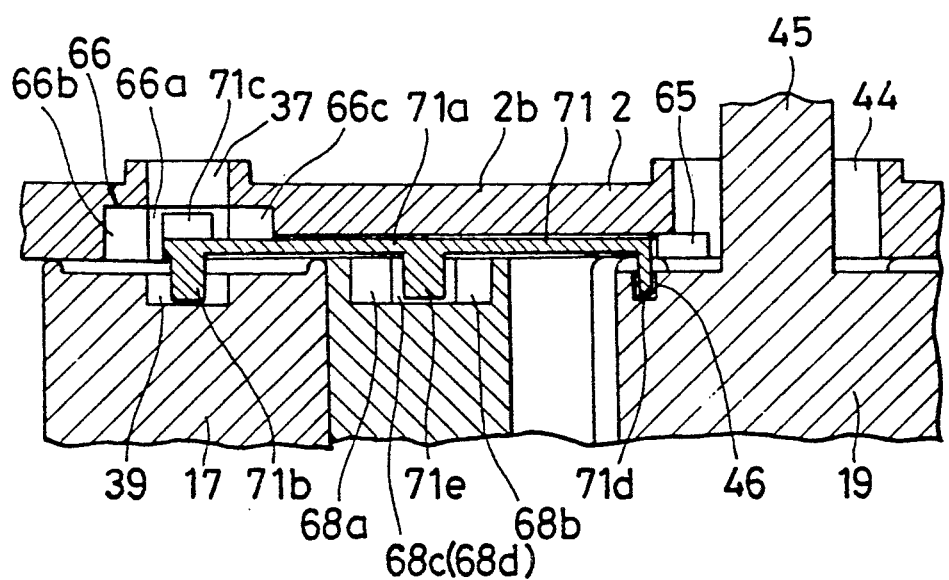
FIG. 5 is a vertical sectional view of the embodiment of FIG. 1 its principal portion.
Figure 6:
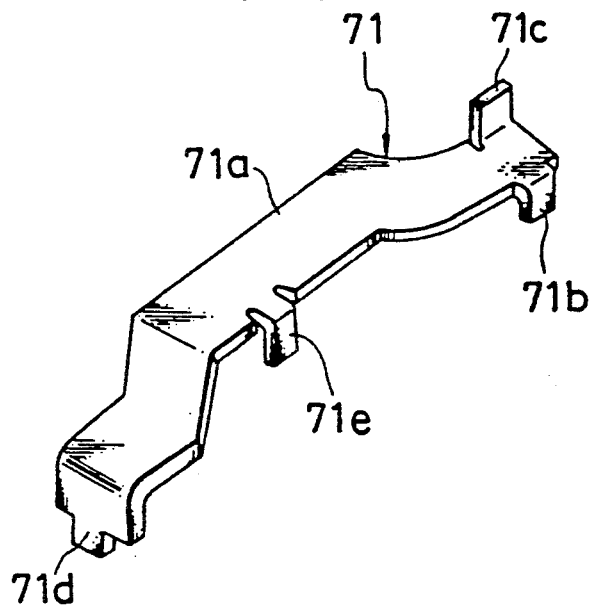
FIG. 6 is a perspective view of the connecting member of the embodiment of FIG. 1.

FIG. 3 shows a plan view of the case 2 and FIG. 4 shows a plan view of the inside of the principal portion, while FIG. 5 is a sectional view of FIG. 4.

As illustrated in FIG. 3, oblong bores 25, 31, 37 and 44 are provided on the ceiling plate 2b of the case 2 in order to respectively allow the drive shafts 26, 32, 38 and 45 to stand upward from the case 2. As illustrated in greater detail in FIGS. 4 and 5, a shallow recess extending from the oblong before 37 to the oblong bore 44 is formed on the inner surface of the ceiling plate 2b. On a part of the recess 65 that adjoins a portion of the edge of the oblong bore 37, there is formed deep engaging groove 66 comprising a wide area 66a stretching in the direction to the longitudinal axis of the oblong bore 37 and a pair of narrow areas 66b and 66c stretching in the direction perpendicular to the longitudinal axis of the oblong bore 37.

As illustrated in FIGS. 1 and 5, there is formed a holder section 67 between the partitions 8 and 9 suspended from the ceiling plate 2b for holding a connecting member, which will be described in detail later. On the upper surface of the holder section 67, there is provided a cross-shaped holding groove 68 comprising a pair of narrow groove sections 68a and 68b running in the direction parallel to the side wall 2a of the case 2 and a pair of wide groove sections 68c and 68d running in the direction perpendicular to the side wall 2a of the case 2.

Reference numeral 71 in FIGS. 1, 2, 3 and 5 denotes a connecting member for connecting the slider 17 and the slider 19.

The connecting member 71 comprises a main body 71a realized roughly in the form of a narrow plate, a downward first holding lug 71b, an upward second holding lug 71c arranged in parallel with the first holding lug 71b, a downward third holding lug 71d arranged perpendicularly to the first and second lugs and a downward fourth holding lug 71e arranged near the middle of the main body 71a. The connecting member 71 is made of a rigid metal material. The width of the first holding lug 71b is so determined that it can be securely received in the recess 39 formed on the upper surface of the slider 17 and at the same time moved within the recess 39 beyond the operational range of the slider 19.

On the other hand, the width of the third holding lug 71d is so determined that it can be securely received in the recess 46 formed on the surface of the slider 19 and at the same time moved within the recess 46 beyond the operational range of the slider 17.

The second holding lug 71c is so formed that, when the sliders 17 and 19 are both moved to a neutral position, it is located at the middle of the wide area 66a and the narrow areas 66b and 66c of engaging groove 66.

Moreover, the fourth holding lug 71e is so formed that, when the sliders 17 and 19 are both moved to a neutral position, it is located at the crossing of the narrow groove sections 68a and 68b and the wide groove sections 68c and 68d of the holding groove 68.

Of the connecting member 71, the main body 71a is received in the recess 51 and the first and third holding lug 71b and 71d are respectively received in the recesses 39 and 46 respectively formed on the upper surface of the sliders 17 and 19 as illustrated in FIG. 5. On the other hand, the second holding lug 71c is received in the engaging groove 66, while the fourth holding lug 71e is received in the holding groove 68.

Now the operation of the embodiment of the switch device according to the invention will be described by referring to FIGS. 7 through 11. The functional movement of the sliding switch SW1 and that of the sliding switch SW2 are similar to those of their counter parts described earlier with regard to an example of a conventional switch device and hence they will be not be described here any further with a view to avoiding duplicity.

Figure 7:
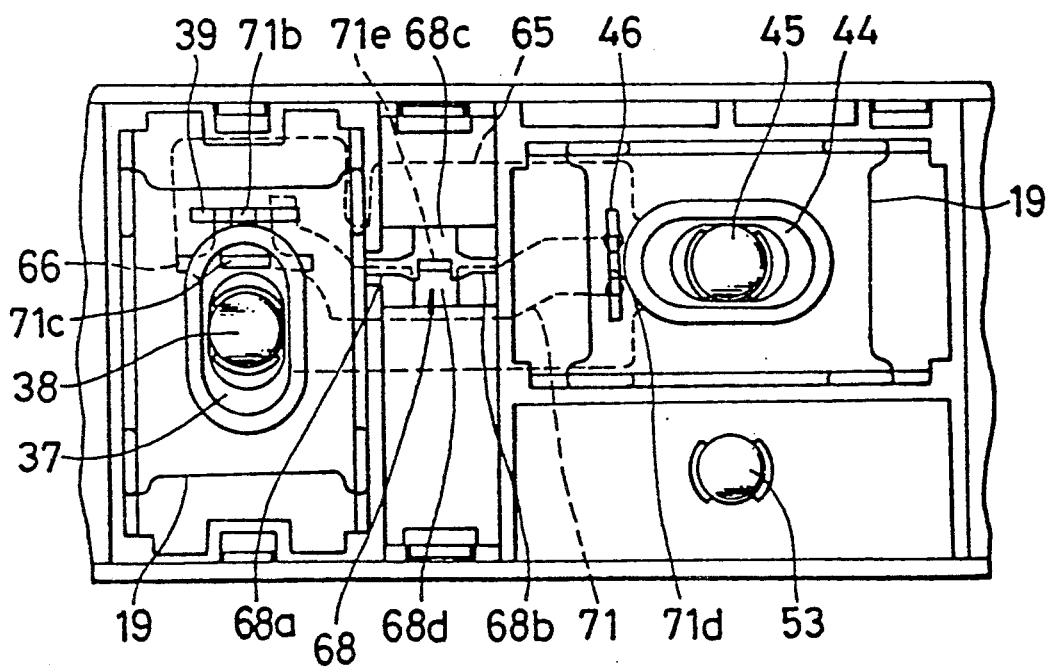
FIGS. 7 through 11 are schematic views of the principal portion of the embodiment of FIG. 1, illustrating the operation of the switch device.

Firstly referring to FIG. 7, when the sliders 17 and 19 are set to the neutral position or the middle position in the respective operational ranges, the sliding switches SW3 and SW4 are held to OFF-state. Under this condition, the second holding lug 71c formed on the connecting member 71 is positioned at the middle of the wide area 66a and the narrow areas 66b and 66c of the engaging groove 66, while the fourth holding lug 71e is positioned at the crossing of the narrow holding groove sections 68a and 68b and the wide holding groove sections 68c and 68d of the holding groove 68 such that the two sliders 17 and 19 can be moved in any direction.

Figure 8:
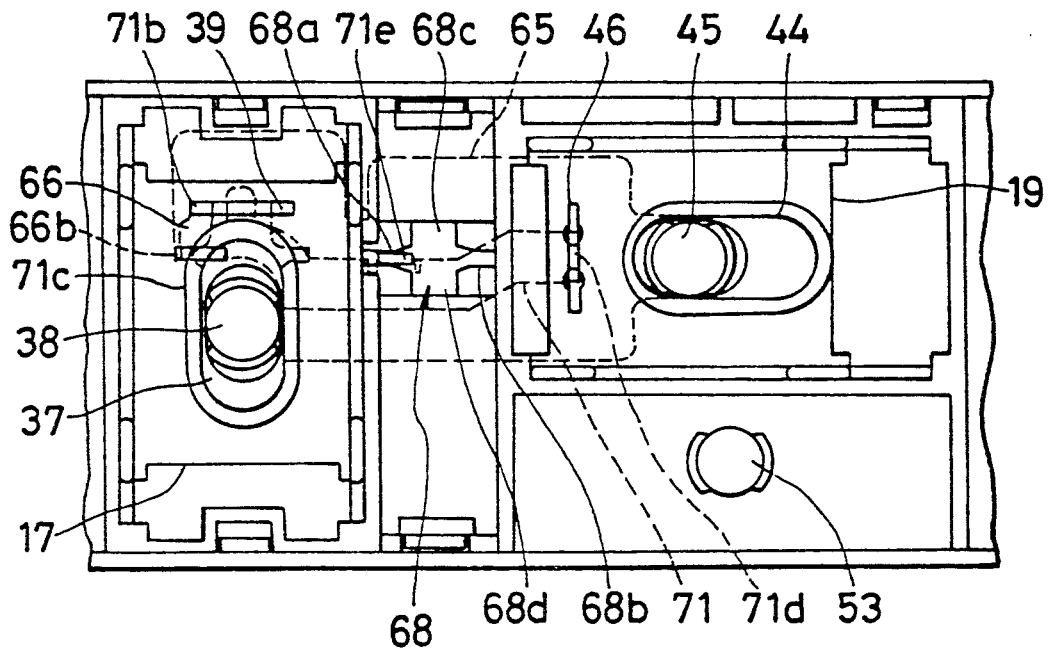

If now the slider 19 is moved to upper left in the sense as shown in FIG. 8, the sliding switch SW4 is turned on and consequently, for example, the motor is driven in the normal direction to tilt the back of the related automobile seat forward. At this time, the connecting member 71 is also moved to upper left in FIG. 8 with the slider 19 and the first holding lug 71b formed on the connecting member 71 is moved along the recess 39 formed on the upper surface of the slider 17 up to the end of the recess 39. The second holding lug 71c is received in the narrow area 66b of the engaging groove 66, while the fourth holding lug 71e is received in the narrow groove section 68a of the holding groove 68. Consequently, if any force is applied to the first knob 47 in the direction to drive the slider 17, the sliding switch SW3 is prohibited from being turned on because the slider 17 is engaged with the ceiling plate 2b of the case 2 by means of the second holding lug 71c. When the force applied to the second knob 48 is removed, the slider 19 is returned to the neutral position as shown in FIG. 7 by the resilient force of the coil spring 43 to stop the tilting motion of the back of the automobile seat.

Figure 9:
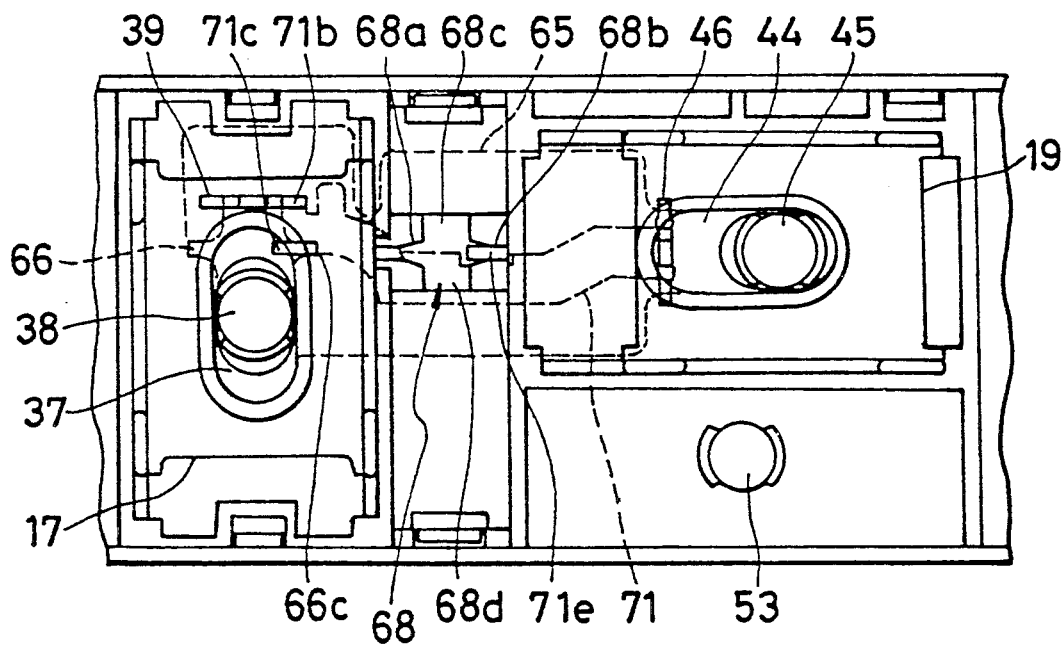

On the other hand, when the slider is moved upper right in FIG. 9, the sliding switch SW4 is set to ON-state to, for example, drive reversely the drive motor to tilt back the back of the automobile seat. At this time, the connecting member 71 is moved upper right along with the slider 19 and the first holding lug 71b formed on the connecting member 71 is moved along the recess 39 formed on the upper surface of the slider 17 up to the right end of the recess 39. The second holding lug 71c is received in the narrow area 66c of the engaging groove 66, while the fourth holding lug 71e is received in the narrow groove section 68b of the holding groove 68. Consequently, if any force is applied to the first knob 47 in the direction to drive the slider 17, the sliding switch SW3 is prohibited from being turned on because the slider 17 is engaged with the ceiling plate 2b of the case 2 by means of the second holding lug 71c. When the force applied to the second knob 48 is removed, the tilting motion of the back of the automobile seat is stopped as described above.

Figure 10:
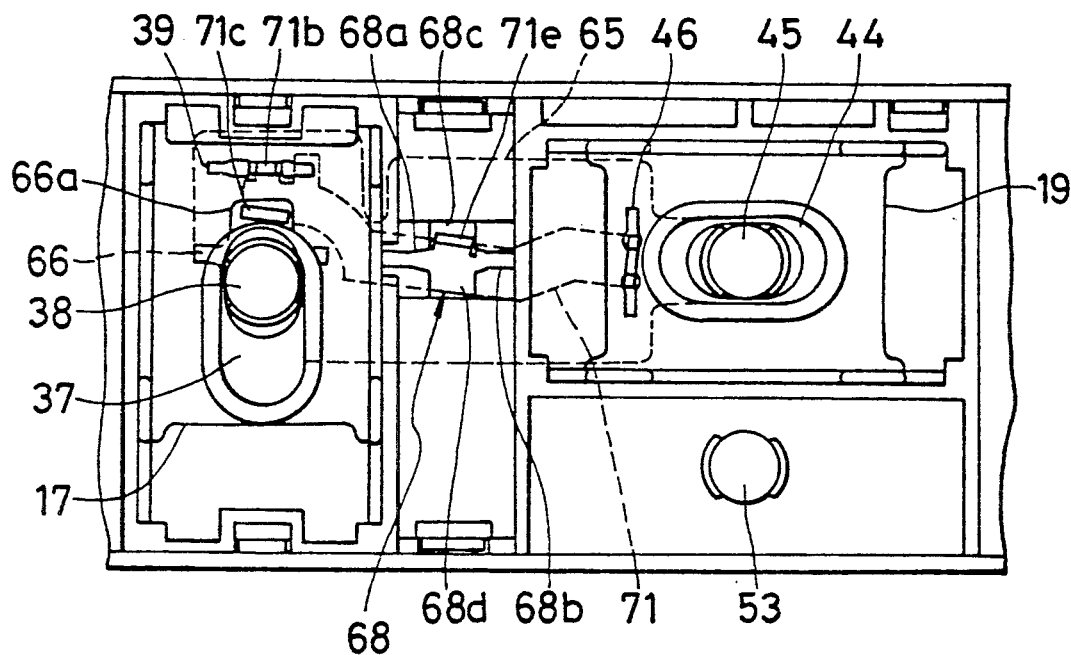

When the slider 17 is moved upward in FIG. 10 from the condition where the sliders 17 and 19 are in the neutral position, the sliding switch SW3 is turned on to, for example, drive the drive motor, not shown, in the normal direction to raise the rear portion of an automobile seat. At this time, the leftmost end of the connecting member 71 is moved upward in FIG. 10 and the second holding lug 71c formed on the connecting member 71 is received in time the fourth holding lug 71e is received in the wide groove section 68c of the holding groove 68. Consequently, if any force is applied to the second knob 48 in the direction to drive the slider 19, the sliding switch SW4 is prohibited from being turned on because the slider 19 is engaged with the ceiling plate 2b of the case 2 by means of the second holding lug 71c. When the force applied to the first knob 47 is removed, the slider 17 is moved back to the neutral position as shown in FIG. 7 to stop the rising motion of the rear portion of the automobile seat.

Figure 11:
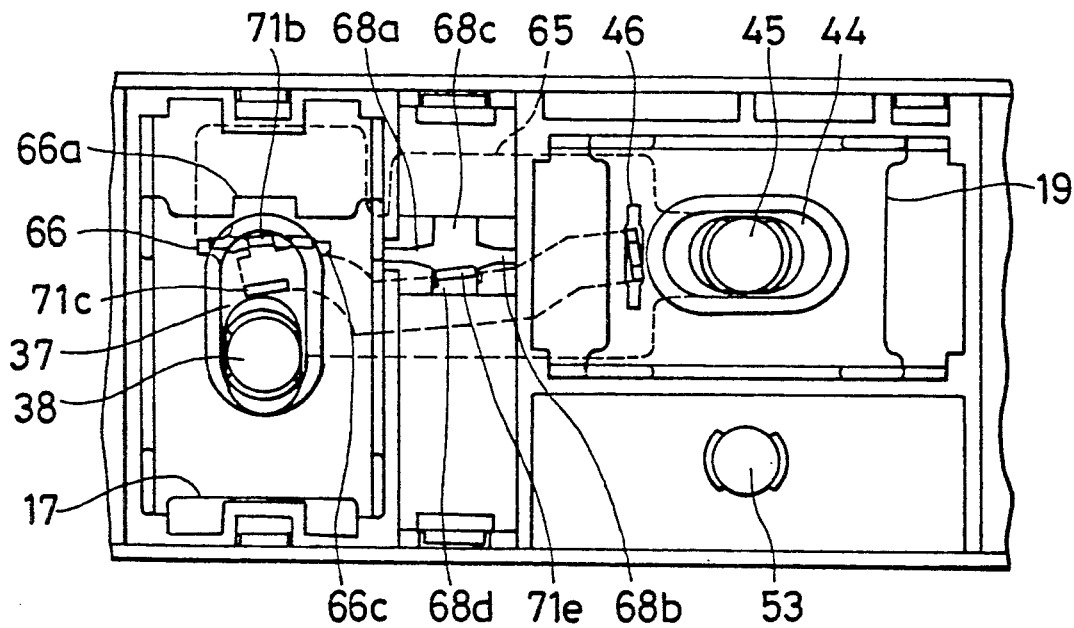

When the slider 17 is moved along the vertical line of FIG. 11 from the condition where the sliders 17 and 19 are in the neutral position, the sliding switch SW3 is turned on to drive the drive motor, not shown, in the reverse direction to, for example, lower the rear portion of the automobile seat. At this time, the leftmost end of the connecting member 71 is moved downward in FIG. 11 and the fourth holding lug 71e formed on the connecting member 71 is received in the wide groove section 68d of the holding groove 68. Consequently, if any force is applied to the second knob 48 in the direction to drive the slider 19, the sliding switch SW4 is prohibited from being turned on because the slider 19 is engaged with the ceiling plate 2b of the case 2 by means of the fourth holding lug 71e. When the force applied to the first knob 47 is removed, the lowering motion of the rear portion of the automobile seat is stopped in a manner similar to that described above.

Since the above embodiment of the switch device according to the present invention comprises a pair of holding lugs 71c and 71d formed on the connecting member 71 for connecting two sliders 17 and 19, an engaging groove 66 and a holding groove 68, the engaging groove 66 and said holding groove 68 being formed on the case 2 of the switch device in such a manner that, when either of the sliders is driven, the holding lugs 71c and 71d are engaged with them to prohibit any motion to drive the other slider, the two sliding switches SW3 and SW4 are never set to On-state simultaneously. With such an arrangement, the capacity of the electro-conductive network for power source which is shared by the two sliding switches in such a switch device can be significantly reduced and consequently the size and weight as well as the manufacturing cost of such a device can be considerably reduced.

Moreover, the recess 51 formed on the inner surface of the case 2 to accommodate the main body 71a of the connecting member 71 contributes to prevention of any undesired aggrandizement of the switch device.

Similarly, the thickness of the device can be reduced and at the same time its structural rigidity can be enhanced by the provision of the second holding lug 71c formed at an end of the connecting member 71 to prohibit motion of the slider 17, factors that also contribute to avoidance of any additional size and weight of the device.

The fact that the connecting member 71 is realized in the form of a plate, the connecting member 71 comprising a main body 71a and a number of holding lugs 71b through 71d which are bent and projecting from the main body 71a in such a manner that they can be received in the recesses 39 and 46 formed on the sliders and the engaging groove 66 and the holding groove 68 formed on the case 2 contributes to simplification of the structure of the device and manufacture of the device at low cost.

It should be noted that the spirit of the present invention lies in that two sliders are connected by a connecting member engaging means are provided in such a manner that when either of the two sliders are operated they prohibit operation of the other slider and that the connecting member, the case, the sliders and other members constituting the switch device are not limited to those of the described above and various modifications can be made thereto.

Figure 12:
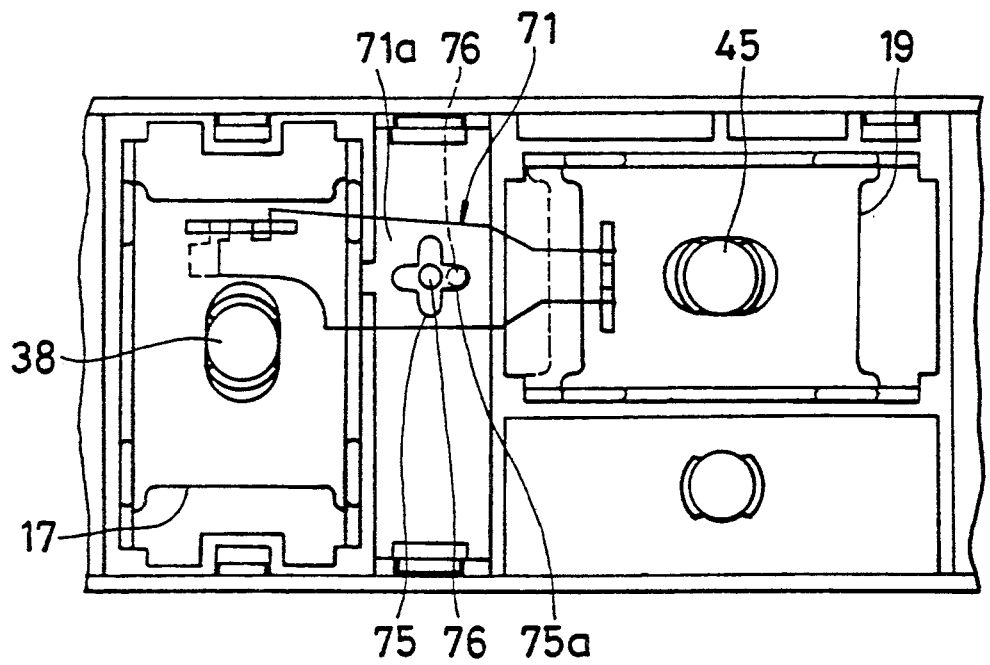
Figure 13:
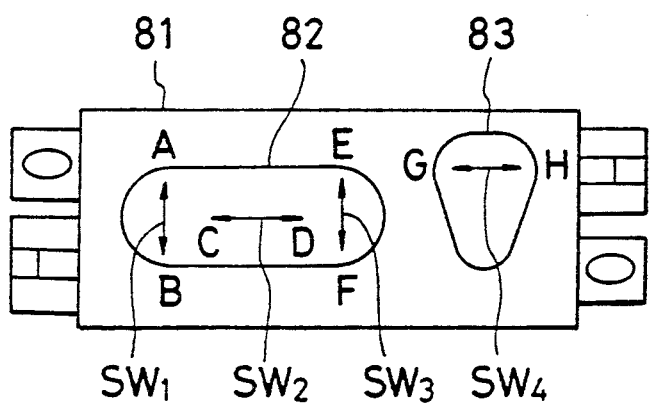
FIG. 13 is a schematic illustration of the configuration of a conventional switch device.

For example, as shown in FIG. 12, a cross-shaped slot 75 may be formed on the main body 71a of the connecting member 71 to receive a holding pin 76 suspended from the case 2 (not shown) in such a manner that either one of the sliders 17 and 19 is selectively operated. With a switch device having such a configuration, when either one of the two sliders (slider 19 in FIG. 12) is driven to the position as shown by the broken line in FIG. 12, the connecting member 71 is moved in the same direction in an interlocked manner until the holding pin 76 is engaged with the edge section 75a of the slot 75 to prohibit any motion of the other slider.

While the second holding lug 71c formed on the connecting member 71 and the engaging groove 66 formed on the case 2 are engaged with each other to prohibit any motion of the slider 17, in the above embodiment, engagement between the fourth holding lug 71e formed on the connecting member 71 and the holding groove 68 formed on the case 2 may be utilized for prohibition of motion of the other slider in order to omit the second holding lug 71c and the engaging groove 66.

It may be apparent that many other modifications are possible without departing from the scope of the present invention.

What is claimed is:

1. A switch device comprising:
   a body;
   a first switch integral with said body and comprising a first movable switch element having a first neutral position and at least two first operating positions;
   a second switch integral with said body and comprising a second movable switch element having a second neutral position and at least two second operating positions; and
   a mechanism comprising:
   a first portion in cooperative engagement with said first switch element;
   a second portion in cooperative engagement with said second switch element;
   a third portion integral with said body; and
   a fourth portion integral with said first portion and said second portion and in cooperative engagement with said third portion,
   wherein when said first switch element is in one of said first operating positions, said first switch element affects said fourth portion such that the cooperative engagement of said third and fourth portions prevents a movement of said second switch element from said second neutral position into one of said second operating positions.

2. A switch device as in claim 1, wherein when said second switch element is in one of said second operating positions, said second switch element affects said fourth portion such that the cooperative engagement of said third and fourth portions prevents a movement of said first switch element from said first neutral position into one of said first operating positions.

3. A switch device as in claim 2, wherein said first portion is movably connected to said first switch element, and wherein said second portion is movably connected to said second switch element.

4. A switch device as in claim 2, wherein said first portion is slidably connected to said first switch element, and wherein said second portion is pivotally connected to said second switch element.

5. A switch device as in claim 1, wherein said third portion comprises a member having a recess; and wherein said fourth portion comprises a lug movably disposed in said recess.

6. A switch device as in claim 5, wherein
   said recess is a cross-shaped recess; and
   said lug is disposed in an arm of said recess when said first switch element is in one of said first operating positions.

7. A switch device as in claim 5, wherein
   said recess is a T-shaped recess; and
   said lug is disposed in an arm of said recess when said first switch element is in one of said first operating positions.

8. A switch device as in claim 1, wherein said fourth portion comprises a member having a recess; and wherein said third portion comprises a lug movably disposed in said recess.

9. A switch device as in claim 8, wherein
   said recess is a cross-shaped recess; and
   said lug is disposed in an arm of said recess when said first switch element is in one of said first operating positions.

* * * * *